(12) United States Patent
Drezner et al.

(10) Patent No.: US 8,472,523 B2
(45) Date of Patent: Jun. 25, 2013

(54) METHOD AND APPARATUS FOR DETECTING HIGH LEVEL WHITE NOISE IN A SEQUENCE OF VIDEO FRAMES

(75) Inventors: David Drezner, Raanana (IL); Alexander Ulanovsky, Haifa (IL)

(73) Assignee: Broadcom Corporation, Irvine, CA (US)

( * ) Notice: Subject to any disclaimer, the term of this patent is extended or adjusted under 35 U.S.C. 154(b) by 2066 days.

(21) Appl. No.: 11/203,431

(22) Filed: Aug. 15, 2005

(65) Prior Publication Data

US 2006/0062307 A1 Mar. 23, 2006

Related U.S. Application Data

(60) Provisional application No. 60/601,182, filed on Aug. 13, 2004.

(51) Int. Cl.
*H04N 7/12* (2006.01)
(52) U.S. Cl.
USPC .................................. 375/240.16; 375/240.02
(58) Field of Classification Search
USPC .................. 375/240, 240.01, 240.02, 240.12, 375/240.16, 240.15; 382/254
See application file for complete search history.

(56) References Cited

U.S. PATENT DOCUMENTS

| 5,621,467 | A | * | 4/1997 | Chien et al. | 375/240.15 |
| 5,793,435 | A | | 8/1998 | Ward et al. | |
| 6,731,818 | B1 | * | 5/2004 | Conklin | 382/254 |
| 6,842,483 | B1 | * | 1/2005 | Au et al. | 375/240.16 |
| 7,450,639 | B2 | * | 11/2008 | Song | 375/240.12 |
| 2005/0286628 | A1 | | 12/2005 | Drezner | |

OTHER PUBLICATIONS

Chen, Y. et al., "Optimizing INTRA/INTER Coding Mode Decisions," *Proc. Of International Symposium on Multimedia Information Processing*, pp. 561-568, Springer-Verlag, DE (1997).
Wu, C. et al. , "Adaptive Postprocessors With DCT-Based Block Classifications," *The 2001 IEEE International Symposium on Circuits and Systems*, vol. 5, pp. 271-274, IEEE, US (2001).

\* cited by examiner

*Primary Examiner* — Allen Wong
(74) *Attorney, Agent, or Firm* — Sterne, Kessler, Goldstein, Fox P.L.L.C.

(57) ABSTRACT

A system and/or method for detecting white noise in a sequence of video frames, and a computer program product is described to affect the quantization step size. In the method/system the correlation between motion vectors of macroblocks is calculated and compared to a predefined threshold. The correlation between motion vectors is used as an indicator for noise in the frames. The quantization step size is then adapted according to the detected level of noise.

14 Claims, 4 Drawing Sheets

METHOD AND APPARATUS FOR DETECTING HIGH LEVEL WHITE NOISE IN A SEQUENCE OF VIDEO FRAMES

CROSS REFERENCE TO RELATED APPLICATIONS

This application claims priority from U.S. Provisional Application No. 60/601,182, filed on Aug. 13, 2004, entitled "Method and Apparatus for Detecting High Level White Noise in a Sequence of Video Frames" which is incorporated by reference herein in its entirety.

BACKGROUND OF THE INVENTION

1. Field of the Invention

The invention relates to a method and an apparatus to detect high level white noise in a sequence of video frames to be encoded.

2. Background Art

In digital video or video-audio systems such as video-telephone, teleconference and digital television systems, a large amount of digital data is needed to define each video frame signal. As the available frequency bandwidth of a conventional transmission line is limited, it is necessary to reduce and compress the volume of data, in order to transmit the data through the channel.

In the state of the art there are several methods and techniques known for reducing and compressing the amount of data. Each of these techniques is aimed to provide the best quality of the images and to reduce and compress the amount of digital data at the same time.

One of these techniques for encoding video signals for a low bit-rate encoding system is an object-oriented analysis-synthesis coding technique, wherein an input video image is divided into objects and three sets of parameters. One of these parameter sets is for defining the pixel data of each object, one for the contours and one for defining the motions of each object between the images. The parameter sets are processed through different encoding channels.

One example of such an object-oriented scheme is the so-called MPEG (Moving Pictures Experts Group) phase 4 (MPEG-4), which is designed to provide an audio-visual coding standard for allowing content-based interactivity, improved coding efficiency and/or universal accessibility in such applications as low-bit rate communications, interactive multimedia (e.g. games, interactive TV and the like) and surveillance (see, for instance, MPEG-4 Video Verification Model Version 2.0, International Organization for Standardization, ISO/IEC JTC/SC29/WG11 N1260, March 1996).

According to MPEG-4, an input video image is divided into a plurality of video object planes (VOP's), which correspond to entities in a bit stream that a user can have access to and manipulate. A VOP can be referred to as an object and can be represented by a bounding rectangle whose width and height may be chosen to be smallest multiples of 16 pixels (a macro block size) surrounding each object so that the encoder processes the input video image on an VOP-by-VOP basis, i.e., an object-by-object basis. The VOP includes color information consisting of the luminance component (Y) and the chrominance components (Cr, Cb) and the contour information represented by, e.g., a binary mask.

Also, among various video compression techniques, the so-called hybrid coding technique is known, which combines temporal and spatial compression techniques together with a statistical coding technique.

Most hybrid coding techniques employ a motion compensated DPCM (Differential Pulse Code Modulation), two-dimensional DCT (Discrete Cosine Transform), quantization of DCT coefficients, and VLC (Variable Length Coding). The motion compensated DPCM is a process of estimating the movement of an object between a current frame and its previous frame, and predicting the current frame according to the motion flow of the object to produce a differential signal representing the difference between the current frame an its prediction.

Specifically, in the motion compensated DPCM, current frame data is predicted from the corresponding previous frame data based on an estimation of the motion between the current and the previous frames. Such estimated motion may be described in terms of two dimensional motion vectors representing the displacements of pixels between the previous and the current frames.

There have been two basic approaches to estimate the displacements of pixels in an object. Generally, they can be classified into two types: a block-by-block estimation and a pixel-by-pixel approach.

In the pixel-by-pixel approach the displacement is determined for each and every pixel. This technique allows a more exact estimation of the pixel value and has the ability to easily handle scales changes and non-translational movements, e.g., scale changes and rotations of the object. However, in the pixel-by-pixel approach, since a motion vector is estimated for each and every pixel, thus producing a huge amount of motion vectors to be transferred to the receiver. Therefore it is virtually impossible to transmit all of the motion vectors to a receiver. Also at the receiving end these vectors must be processed when calculating the next frame or picture and thus cause heavy load on the processor of the receiving system.

Using the block-by-block motion estimation, on the other hand, a current frame is divided into a plurality of search blocks. A search block is a block of for instance 16×16 adjacent pixels, so that a frame is divided into a plurality of search blocks. To determine a motion vector for a search block in the current frame, a similarity calculation is performed between the search block in the current frame and each of a plurality of equal-sized reference blocks included in a generally larger search region within the previous frame.

An error function such as the mean absolute error or mean square error is used to carry out a similarity measurement between the search block in the current frame and the respective reference blocks in the search region of the previous frame. The motion vector, by definition, represents the displacement between the search block and a reference block, which yields a minimum error function. A method, wherein a motion vector is determined using a current macroblock (MB) (16×16 pixels) and at least one preceding frame as reference, is referred to as intermode encoding (intermode is removing first temporal redundancy by subtracting current MB info from best match reference info and then spatial redundancy if still exists with the DCT transform).

As a search region, for example, a relatively large fixed-sized region around the search block might be used (the search block being in the center of the search region).

Another option is to—preliminary—predict the motion vector for a search block on the basis of one or several motion vectors from surrounding search blocks already—finally—determined, and to use as a search region, for example, a relatively small region around the center of the—preliminary predicted—motion vector (the tip of the predicted motion vector being in the center of the search region). A method like this, which uses only current MB info for MB coding i.e. not using reference+motion vector is referred to as intramode encoding (intramode removing only MB's spatial redundancy by using DCT transform).

BRIEF SUMMARY OF THE INVENTION

An apparatus and/or method for detecting white noise in a sequence of video frames, and a computer program product, substantially as shown in and/or described in connection with at least one of the figures, as set forth more completely in the claims.

The invention is aimed at a novel method for detecting high level noise in a sequence of video frames. It is to be noted that the proposed methods can preferably be used in those motion estimation systems that do not take motion vector difference (mvd) overhead cost into account for selecting the lowest cost candidate.

A method for detecting white noise in a sequence of video frames is provided, comprising the steps:

calculating the sum of correlation values of motion vectors of a predefined number of adjacent macroblocks in a frame for a number of frames;

comparing the calculated sum for each frame to a predefined threshold value; and affecting the size of quantization steps in a quantizer, if the predefined threshold value is exceeded by the calculated sum of each of the frames of the sequence.

According to a further aspect of the invention, a method for detecting white noise in a sequence of video frames is provided, wherein the sequence of video frames does not contain a scene change, comprising the steps:

counting the number of macroblocks which have to be intramode encoded and which can be intermode encoded in P- or B-frames for each frame of the sequence of frames;

calculating the rate between intramode encoded macroblocks and the number of intermode encoded macroblocks in the frame for each of the frames;

comparing the determined value for each frame to a predefined threshold value; and deciding if the determined rate exceeds a predefined threshold and correspondingly, if the threshold is exceeded by each value of the frames of the sequence, adapting the step size of the quantizer.

Furthermore a corresponding apparatus adapted to this further aspect of the invention is disclosed, comprising:

a counter for counting macroblocks in a P- of B-frame which have to be intramode encoded;

a counter for counting the macroblocks in the P- or B-frame which can be intermode encoded;

a calculator to calculate the rate between the intramode encoded macroblocks and the intermode encoded macroblocks for each frame of the sequence;

a comparator to compare the calculated rate values to a predefined threshold value for each of the frames; and a controller adapted to affect a quantizer in case the predefined threshold value is exceeded by all of the calculated values of the sequence of frames.

BRIEF DESCRIPTION OF THE DRAWINGS/FIGURES

The above and other features, aspects and advantages of the present invention will be more fully understood when considered with respect to the following detailed description, appended claims and accompanying drawings, wherein:

DETAILED DESCRIPTION OF THE INVENTION

It is to be mentioned that the proposed methods are suitable preferably in motion estimation systems that do not take motion vector difference overhead cost (mvd) into account.

In the aforementioned video and/or video/audio systems the motion flow of an object in a sequence of frames is described by the macroblocks, which are needed to display the object in a frame, and their corresponding motion vectors. In P- and B-frames each macroblock is assigned a motion vector.

Figure 1:
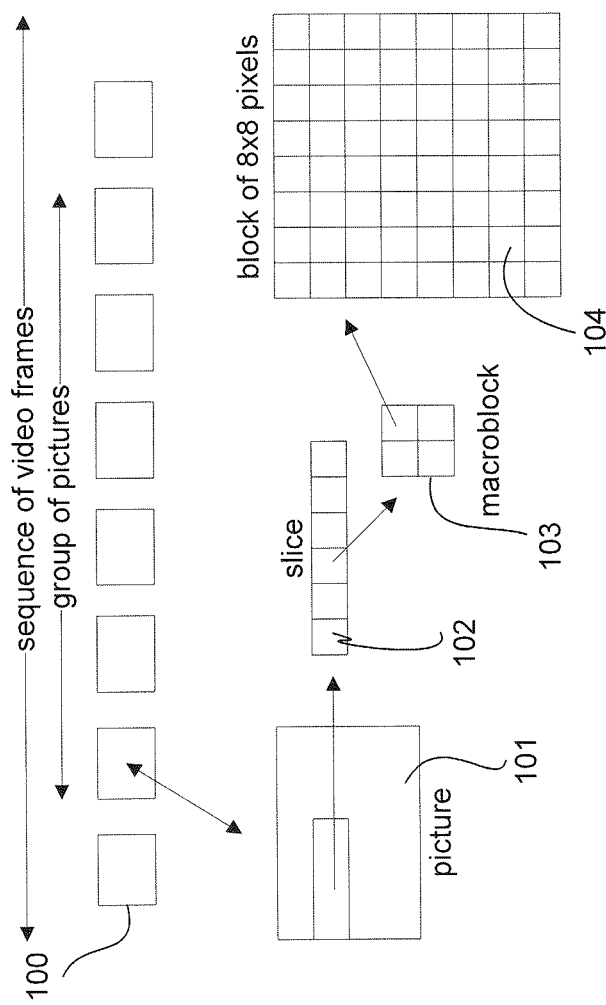
FIG. 1 is a simplified block diagram showing a sequence of video frames to be processed and how each frame is divided into slices and macroblocks of 16×16 pixels.

As is shown in FIG. 1 a sequence of video frames 100 is processed wherein a frame 101 is divided into slices 102, each slice 102 comprising macroblocks 103 of 16×16 pixels which are subdivided into pixel blocks 104 of 8×8 pixels.

As mentioned afore the division of a frame into macroblocks is essential for using the principle of motion prediction.

Figure 2:
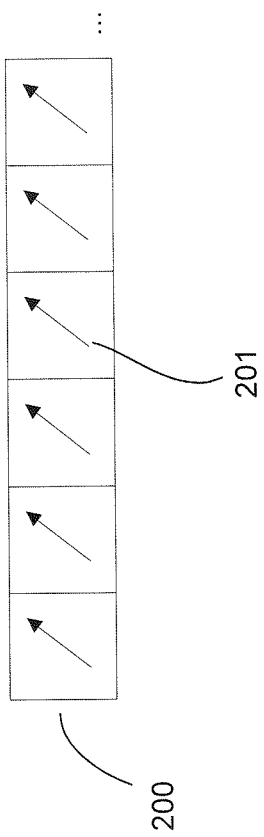
FIG. 2 shows a simplified block diagram of adjacent macroblocks with their calculated motion vectors inside.

Referring now to FIG. 2 it can be seen, that in case of a plurality of adjacent pixel blocks moved in the same direction and for the same distance, e.g. if these pixel blocks are needed for a single object, the motion vectors of these pixel blocks are identical. This applies to any plurality of pixel blocks, which are moved in the same direction and for the same distance, regardless if they are needed to display a single object.

A motion vector usually is characterized by its x/y components, which represent the displacement of the pixel block on the x- and y-axis between a current frame and a previous frame. The correlation between two motion vectors can be measured by calculating the difference of their x- and y-component. The correlation of two motion vectors is high, if the difference of their x- and y-components is low.

For a plurality of macroblocks 200 being moved into the same direction and the same distance, the motion vectors 201 have identical values for the displacement in the x-axis direction and the y-axis direction. If the correlation between these motion vectors is calculated, for example, by calculating the sum of the absolute differences of the x-axis values and the y-axis values, it is found, that there is no difference, so that the correlation of these motion vectors is very high.

Video and/or video/audio systems as known in the state of the art employ a camera for generating the frames. The camera may either be an analog camera or a digital camera. In case that an analog camera is used, there is a digitizer used to convert the analog picture into digital data. As is known in the state of the art, either system produces errors in the generated digital frames. One of these errors, for example, is caused by the quantizer, which is employed in either system. Generally, these errors depend on the video resolution, the step size of the quantizer and physical properties of the analog front end device. The errors result in so called white noise, which is also known as Gaussian noise.

Figure 3:
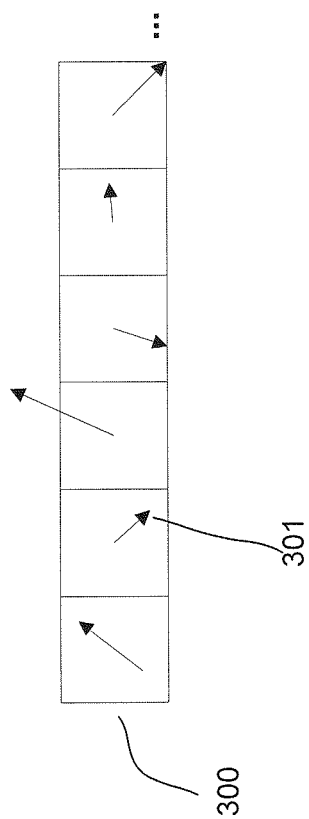
FIG. 3 shows a simplified block diagram of adjacent macroblocks with almost no correlation between the motion vectors of adjacent macroblocks.

FIG. 3 shows an example of a plurality of adjacent macroblocks 300 wherein the motion vector 301 of a macroblock has no correlation to the motion vectors of the adjacent macroblocks.

It is found that these pixel errors affect the afore described determination of the motion vector of a macroblock in that the motion vector differs in the x/y value from a motion vector, which would be determined in the absence of white noise.

Furthermore the difference between a motion vector determined between pictures including white noise and a motion vector determined in absence of white noise increases with increasing white noise.

So if the correlation between motion vectors of adjacent macroblocks of frames, whose pixel values are somewhat distorted by white noise, is calculated and compared to the correlation between corresponding motion vectors of frames without white noise in it, it is found, that the correlation of motion vectors of adjacent macroblocks decreases with increasing white noise.

The invention makes use of this dependency between the quantity of white noise in a frame and the value of the correlation between motion vectors of adjacent macroblocks.

According to a first aspect of the invention the correlation of motion vectors is calculated as the sum of differences of two motion vectors of adjacent macroblocks, e.g. for a motion vector of a current macroblock and its left neighbor, in a frame for a predefined number of adjacent macroblocks. This correlation value is calculated for each frame in a sequence of frames.

For each frame the sum is then compared to a predefined threshold value. If the threshold value is exceeded for a number of frames, then it is concluded that this sequence of frames contains white noise.

The sum of differences of the motion vectors of each frame can be calculated by different algorithms. For instance the following algorithm can be used, which calculates the correlation between a motion vector of a current macroblock and the preceding macroblock that is its left neighbor:

$$AMC = \sum_{n=1}^{N} \mathrm{abs}(x_n - x_{n-1}) + \mathrm{abs}(y_n - y_{n-1})$$

wherein
AMC=Accumulated Motion Correlation
n=macroblock index, running from 1 to predefined macroblock number N
x=x-axis (horizontal) component of a motion vector
y=y-axis (vertical) component of a motion vector
abs=absolute function Another algorithm to calculate the correlation between two motion vectors of adjacent macroblocks is the euklidic distance, so that for one frame the value can be calculated as:

$$AMC = \sum_{n=1}^{N} \sqrt{(x_n - x_{n-1})^2 + (y_n - y_{n-1})^2}$$

The predefined threshold value is subject to be determined by heuristic tests as it is a function of the algorithm used to calculate the sum of differences, the used video resolution, the step size of the quantization table and physical properties of the front end device, e.g. the camera and in the case of an analog camera the analog/digital converter.

This calculation is done during the encoding process. The result can then be used to affect the quantization. As white noise up to a certain degree does not have a major effect on perceiving the frames, the quantization can be coarse, that is the quantization step size can be selected bigger.

Generally the quantization step size used for quantizing a data block of the DCT (Discrete Cosine Transformation) coefficients is inter alia selected as a function of the buffer transmission occupancy so as to limit the amount of encoded data to a predetermined rate. So if it is found that according to the contained white noise in the frames the size of the quantization steps can be set to a bigger value, then this method can be used to decrease the amount of data to be passed to the output buffer. If then the occupancy of the output buffer is at a low level, the quantization step size can be changed to a smaller step size in case it is useful.

According to a second aspect of the invention the value of the correlation between motion vectors of adjacent macroblocks can be calculated as described afore, but wherein the correlation between the motion vector of a current macroblock and its neighbors is considered, e.g. the differences of the motion vector of a current macroblock and the motion vectors of the left and right macroblock. Also the motion vectors of the adjacent macroblock in the line of macroblocks above and/or below the current macroblock could be taken into account. Although an algorithm, which calculates the correlation for one motion vector of a macroblock with respect to more than one adjacent macroblock, is more time consuming it can lead to better results as it takes the correlation between more motion vectors into account. One criterion for the decision which algorithm to choose can be the available processing power.

According to another aspect of the invention, the rate of intramode versus interframe/intermode encoded frames can be likewise used as a criterion for white noise in a sequence of frames, whereby the calculated rate is to be likewise calculated for each frame in a sequence of frames and each of these values has to be compared to a predefined threshold value.

In a sequence of frames the encoder decides for each macroblock, if it has to be encoded intramode or intermode, that is as a motion vector and a reference to a previous encoded macroblock. In a sequence of frames with a very low level of white noise, a high percentage of the macroblocks in P- and B-frames can be encoded in intermode, so that there are only very few macroblocks which have to be intramode encoded. Only those macroblocks, for which a motion vector cannot be predicted have to intramode encoded.

As a scene change in a sequence of frames causes two frames, which are totally different, all of the macro blocks in the first frame of the new scene have to be intramode encoded. So the criterion of the rate of intramode versus intermode encoded frames fails, if it is considered for only one frame. Therefore the rate of intramode versus intermode encoded macroblocks calculated for a number of frames and each of the values is compared to a predefined threshold. Only if all, or almost all, of the calculated rate values exceed the threshold, it can be decided that there is white noise in the frames.

Furthermore it is found that in a sequence of frames with a higher level of white noise the count of macroblocks, which have to be intramode encoded is higher than without white noise. Moreover it is found that the count of macroblocks to be intramode encoded is a function of the level of white noise. Therefore a histogram of the count of macroblocks, which have to be intramode encoded can be provided and used as a measurement for the level of white noise.

Thus the histogram can be used to decide on how much white noise there is in the frames. Accordingly the quantization step size can be adapted to the determined level of white noise.

Figure 4:
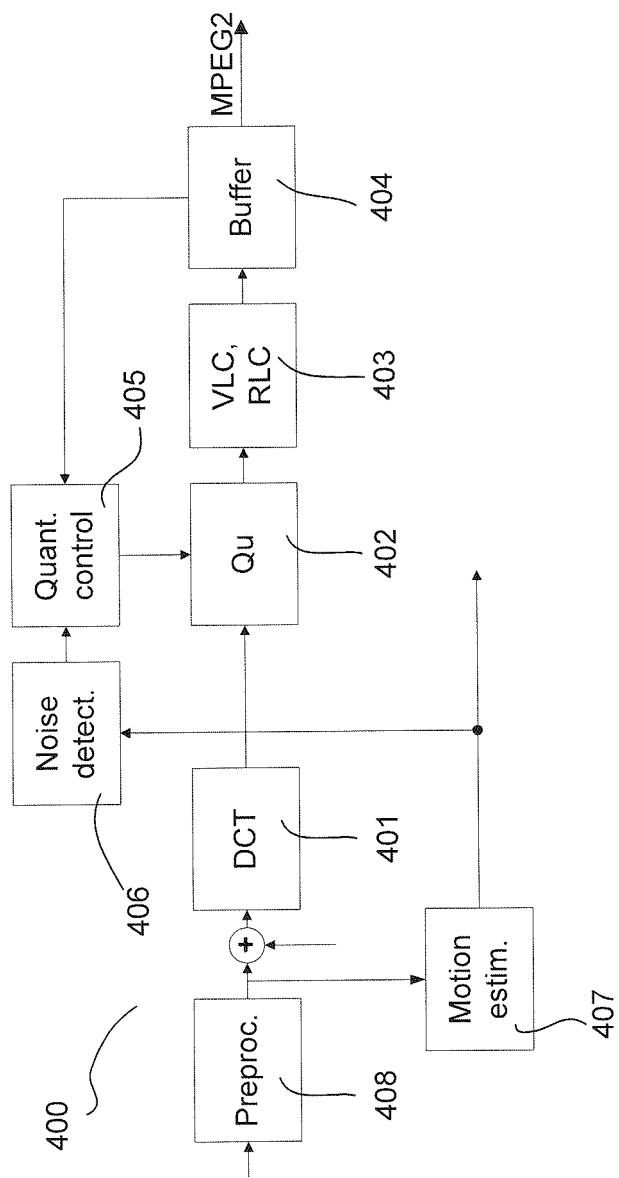
FIG. 4 is a block diagram of a part of a video encoder illustrating one embodiment of the invention.

FIG. 4 shows a part of a video encoder 400. The motion estimation circuit 407 receives the data after the frames have been preprocessed in the preprocessor circuit 408. The output data of the motion estimation circuit 407 is then passed to the noise detection circuit 406 and other circuits, which are omitted in this diagram. The noise detection circuit 406 calculates the correlation of motion vectors according to the aforementioned method and in case that a change in the level of white noise in a frame or sequence of frames is detected, affects the quantization control circuit 405, which controls the quantizer 402. The output data of the quantizer 402 is then further processed by the compression circuit 403, which performs a variable length coding and/or a run length coding on the data. From the compression circuit 403 the video data is then fed into the buffer 404.

Various methods for affecting the quantization step size have been described herein. For example, the method to calculate the noise for a sequence of video frames and to affect the quantization step size accordingly is described. It is to be understood that these are intended to process at least portions or segments of a sequence of video frames. To this end, the term "sequence of video frames" can be considered to be synonymous with "at least a portion of a sequence of video frames".

As is clear for a person skilled in the art the present invention can be implemented in hardware or as a combination of software and hardware. Consequently, the invention can be implemented in the environment of a computer system or other suitable processing system. In the present invention, all of the signal processing blocks can be general purpose computer systems or systems, which are specially adapted for processing a sequence of video frames according to the invention and which may include so called application specific integrated circuits. In addition, as would be appreciated by a person skilled in the art, the present invention can be implemented as a computer program product comprising a computer useable medium encoded with computer readable program code for enabling a computer system to process a sequence of video frames according to the present invention.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for detecting white noise in a sequence of video frames, comprising:
   (a) calculating a noise estimate based on a sum of correlation values of motion vectors of adjacent macroblocks in a frame for a plurality of frames in the sequence of video frames;
   (b) comparing the noise estimate for each frame in the plurality of frames to a predefined threshold value; and
   (c) increasing a size of a quantization step in a quantizer device used to generate the sequence of video frames if the noise estimate for each frame in the plurality of frames is exceeded by the predefined threshold value.

2. The method of claim 1, wherein step (a) comprises:
   (a)(i) calculating a correlation value of a motion vector of a current macroblock and a motion vector of a macroblock adjacent to the current macroblock.

3. The method of claim 2, wherein step (a)(i) comprises:
   (a)(i)(A) calculating the correlation value of the motion vector of the current macroblock and the motion vector of the macroblock adjacent to the current macroblock by adding an absolute difference of x-axis components of the motion vectors and an absolute difference of y-axis components of the motion vectors.

4. The method of claim 1, wherein step (a) comprises:
   (a)(i) calculating a correlation value of a motion vector of a current macroblock and a motion vector of a macroblock adjacent to the current macroblock by evaluating:

$$AMC = \sum_{n=1}^{N} \sqrt{(x_n - x_{n-1})^2 + (y_n - y_{n-1})^2},$$

where AMC represents the correlation value, n represents a macroblock index, x represents a horizontal component of a motion vector, and y represents a vertical component of a motion vector.

5. The method of claim 1, wherein step (a) comprises:
   (a)(i) calculating a correlation value of motion vectors of a predefined number of adjacent macroblocks in the frame from the sequence of video frames, the predefined number of adjacent macroblocks being based upon an available processing power of an encoding system.

6. The method of claim 1, wherein the predefined threshold value is determined according to a heuristic test.

7. An apparatus for detecting white noise in a sequence of video frames, comprising:
   an adder configured to calculate a noise estimate based on a sum of correlation values of motion vectors of adjacent macroblocks in a frame for a plurality of frames in the sequence of video frames;
   a comparator configured to compare the noise estimate for each frame in the plurality of frames to a predefined threshold value; and
   a controller configured to increase a size of a quantization step in a quantizer device if the noise estimate for each frame in the plurality of frames is exceeded by the predefined threshold value.

8. The apparatus of claim 7, wherein the predefined threshold value is determined according to a heuristic test.

9. A computer program product (CPP) comprising a non-transitory computer useable medium encoded with computer readable program code (CRPC) for enabling a computer processor to process a video frame sequence, the CRPC comprising:
   first CRPC for causing the computer processor to calculate a noise estimate based on a sum of correlation values of motion vectors of adjacent macroblocks in a frame for a plurality of frames in the video frame sequence;
   second CRPC for causing the computer processor to compare the noise estimate for each frame in the plurality of frames to a predefined threshold value; and
   third CRPC for causing the computer processor to increase a size of a quantization step in a quantizer device if the noise estimate for each frame in the plurality of frames is exceeded by the predefined threshold value.

10. The CPP of claim 9, wherein the first CRPC is further for causing the computer processor to calculate a correlation value of a motion vector of a current macroblock and a motion vector of a macroblock adjacent to the current macroblock.

11. The CPP of claim 10, wherein the first CRPC is further for causing the computer processor to calculate the correlation value of the motion vector of the current macroblock and the motion vector of the macroblock adjacent to the current macroblock by adding an absolute difference of x-axis components of the motion vectors and an absolute difference of y-axis components of the motion vectors.

12. The CPP of claim 9, wherein the first CRPC is further for causing the computer processor to calculate a correlation value of a motion vector of a current macroblock and a motion vector of a macroblock adjacent to the current macroblock by evaluating:

$$AMC = \sum_{n=1}^{N} \sqrt{(x_n - x_{n-1})^2 + (y_n - y_{n-1})^2},$$

where AMC represents the correlation value, n represents a macroblock index, x represents a horizontal component of a motion vector, and y represents a vertical component of a motion vector.

13. The CPP of claim 9, wherein the first CRPC is further for causing the computer processor to calculate a correlation value of motion vectors of a predefined number of adjacent macroblocks in the frame from the video frame sequence, the predefined number of adjacent macroblocks being based upon an available processing power of an encoding system.

14. The CPP of claim 9, wherein the predefined threshold value is determined according to a heuristic test.

* * * * *